United States Patent
Vasudevan et al.

(10) Patent No.: US 8,811,334 B2
(45) Date of Patent: Aug. 19, 2014

(54) METHODS FOR IDLE REGISTRATION AND IDLE HANDOFF IN A FEMTO ENVIRONMENT

(75) Inventors: Subramanian Vasudevan, Morristown, NJ (US); Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 872 days.

(21) Appl. No.: 12/007,425

(22) Filed: Jan. 10, 2008

(65) Prior Publication Data

US 2009/0097448 A1    Apr. 16, 2009

Related U.S. Application Data

(60) Provisional application No. 60/960,768, filed on Oct. 12, 2007.

(51) Int. Cl.
*H04W 4/00* (2009.01)
*H04W 36/00* (2009.01)

(52) U.S. Cl.
USPC .......................................... 370/331; 455/436

(58) Field of Classification Search
USPC .................................................. 370/350, 331
See application file for complete search history.

(56) References Cited

U.S. PATENT DOCUMENTS

| | | | |
|---|---|---|---|
| 5,548,816 A | 8/1996 | Devaney | |
| 5,613,198 A * | 3/1997 | Ahmadi et al. | 370/337 |
| 5,734,984 A * | 3/1998 | Reece et al. | 455/458 |
| 6,137,991 A * | 10/2000 | Isaksson | 455/67.11 |
| 6,356,758 B1 * | 3/2002 | Almeida et al. | 455/446 |
| 7,035,637 B2 | 4/2006 | Motegi et al. | |
| 7,103,662 B2 | 9/2006 | Ray et al. | |
| 2004/0266445 A1 | 12/2004 | Burgess et al. | |
| 2005/0148297 A1 * | 7/2005 | Lu et al. | 455/3.06 |
| 2005/0148368 A1 | 7/2005 | Scheinert et al. | |
| 2005/0227693 A1 | 10/2005 | Kong et al. | |
| 2007/0097939 A1 | 5/2007 | Nylander et al. | |
| 2007/0105568 A1 | 5/2007 | Nylander et al. | |
| 2007/0124368 A1 * | 5/2007 | Weiser et al. | 709/203 |
| 2007/0140185 A1 | 6/2007 | Garg et al. | |

(Continued)

FOREIGN PATENT DOCUMENTS

| | | |
|---|---|---|
| CN | 1774136 | 5/2006 |
| EP | 1 608 187 | 12/2005 |

(Continued)

OTHER PUBLICATIONS

International Preliminary Report on Patentability dated Apr. 22, 2010 for PCT/US2008/011553.

(Continued)

*Primary Examiner* — Gerald Smarth
(74) *Attorney, Agent, or Firm* — Harness, Dickey & Pierce, P.L.C.

(57) ABSTRACT

In a method for configuring a wireless network, a radio access network establishes a first color code for a femto subnet and a second color code for a macro subnet. The femto subnet includes a plurality of femto cells, and the macro subnet includes at least one macro cell. The macro subnet borders the femto subnet. The radio access network identifies the plurality of femto cells bordering the macro subnet, and assigns the established first and second color codes to the identified border femto cells, while assigning only the first color code to non-bordering femto cells.

12 Claims, 2 Drawing Sheets

(56) References Cited

U.S. PATENT DOCUMENTS

| | | | |
|---|---|---|---|
| 2007/0160008 A1* | 7/2007 | Burgess | 370/331 |
| 2007/0183427 A1 | 8/2007 | Nylander et al. | |
| 2007/0197220 A1* | 8/2007 | Willey | 455/435.1 |
| 2008/0004035 A1* | 1/2008 | Atkins et al. | 455/454 |
| 2009/0042572 A1* | 2/2009 | Craig et al. | 455/436 |
| 2009/0086672 A1* | 4/2009 | Gholmieh et al. | 370/329 |
| 2009/0097436 A1* | 4/2009 | Vasudevan et al. | 370/328 |
| 2009/0156213 A1* | 6/2009 | Spinelli et al. | 455/436 |

FOREIGN PATENT DOCUMENTS

| | | |
|---|---|---|
| EP | 1 657 949 | 5/2006 |
| EP | 1 821 560 | 8/2007 |
| JP | 10-051846 | 2/1998 |
| JP | 2006-141026 | 6/2006 |
| JP | 2007-221777 | 8/2007 |
| WO | WO 93/23965 | 11/1993 |
| WO | WO 00/28770 | 5/2000 |
| WO | WO 01/67786 | 9/2001 |
| WO | WO 2006/094253 | 9/2006 |
| WO | WO 2007/040449 | 4/2007 |
| WO | WO 2007/040452 | 4/2007 |

OTHER PUBLICATIONS

International Preliminary Report on Patentability dated Apr. 22, 2010 for PCT/US2008/011345.

Kim et al., "An Efficient Paging Scheme for Overlaid Microcell/Macrocell Systems," Universal Personal Communications, vol. 2, pp. 961-964, Sep. 29, 1996.

International Search Report dated Feb. 16, 2009 for International Application No. PCT/US2008/011553.

Written Opinion dated Feb. 16, 2009 for International Application No. PCT/US2008/011553.

International Search Report dated Mar. 11, 2009 for International Application No. PCT/US2008/011461.

Written Opinion dated Mar. 11, 2009 for International Application No. PCT/US2008/011461.

International Search Report dated Mar. 25, 2009 for International Application No. PCT/US2008/011345.

Written Opinion dated Mar. 25, 2009 for International Application No. PCT/US2008/011345.

International Preliminary Report on Patentability dated Apr. 22, 2010 for PCT/US2008/011461.

"cdma2000 High Rate Packet Data Air Interface Specification," $3^{rd}$ Generation Partnership Project 2 "3GPP2," Version 2.0, Mar. 2007.

US Office Action dated Dec. 21, 2010, issued in co-pending U.S. Appl. No. 11/907,455.

U.S. Office Action dated Sep. 18, 2012, issued in co-pending U.S. Appl. No. 11/907,455.

Japanese Office Action and English translation thereof dated Mar. 12, 2012.

Chinese Office Action dated Apr. 28, 2012, issued in Chinese Application No. 200880110898.0 and English Translation thereof.

U.S. Office Action mailed Aug. 8, 2011 for U.S. Appl. No. 11/907,455.

Chinese Office Action dated Jun. 29, 2012, issued in Chinese Application No. 200880111029.X and English Translation thereof.

English translation of Japanese Office Action dated Jan. 30, 2012.

* cited by examiner

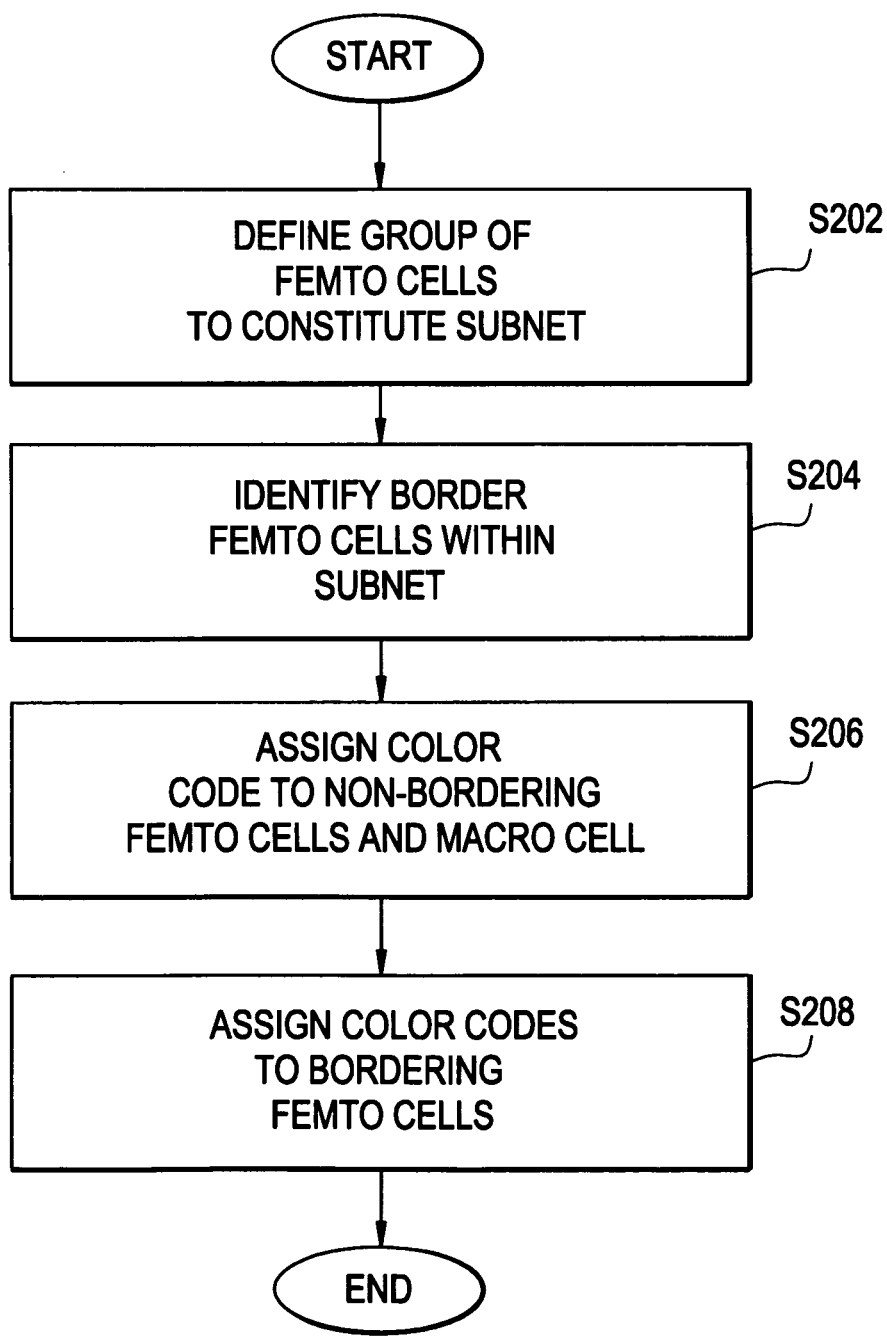

METHODS FOR IDLE REGISTRATION AND IDLE HANDOFF IN A FEMTO ENVIRONMENT

PRIORITY STATEMENT

This non-provisional patent application claims priority under 35 U.S.C. §119(e) to provisional patent application Ser. No. 60/960,768, filed on Oct. 12, 2007, the entire contents of which are incorporated herein by reference.

BACKGROUND OF THE INVENTION

A femto base station is basically a low cost and low power base station (BS) transceiver which is installed indoors (e.g., in a home or office) and connected to the Internet via cable, DSL, on-premise fiber optic link, or a similar IP backhaul technology. This connection is used to integrate the femto base station with the wireless operator's core network.

A femto base station serves a geographic area known as a femto cell over a single carrier or channel. A femto cell typically covers a smaller geographic area or subscriber constituency than a conventional macro cell. For example, a femto base station typically provides radio coverage in a geographical area such as a building or home, whereas a conventional macro base station provides radio coverage in a larger area such as an entire city or town. The function of a femto cell is similar to that of a Wireless LAN (Local Area Network), and provides operators a low cost solution for extending coverage areas and off-loading users from the cellular network.

In a wireless network including femto cells, upon entering a cell, a mobile station in an idle state (hereinafter an idle mobile station) receives broadcast overhead messages such as a sector-parameters message on the well-known broadcast control channel. In the current 3GPP2 CDMA2000 EVDO standards (e.g., 3GPP2 CDMA2000 EVDO standard "cdma2000 High Rate Packet Data Air Interface Specification," 3GPP2 C.S0024-B, Ver. 2.0 (March 2007)), a sector-parameters message includes one or more color codes. Such color codes, which are periodically broadcast as a sequence of bits, are used to identify a particular subnet of a communications network.

While in the idle mode, the mobile station periodically monitors ("wakes up" and receives) the broadcast control channel for changes in the received sector-parameters such as color codes. Conventionally, base stations located at a border area of a particular subnet transmit both primary and secondary color codes. The primary color code is the color code associated with the subnet in which the base station or cell resides, whereas the secondary color code identifies the bordering subnet. The broadcasting of the primary and secondary color codes indicates to mobile stations that they are in a border area of a particular subnet.

Broadcasting of primary and secondary color codes by base stations located in each bordering subnet provides spatial hysteresis and suppresses ping-pong effects. In the current EVDO standard, the secondary color code mechanism provides spatial hysteresis preventing any mobile from conducting idle handoff when the mobile is in a border area covered by the secondary color code. In this case, if the secondary color code is applied at the bordering macro cell, relatively slow moving mobiles conduct handoff only after moving out of the bordering macro cell. Because these mobiles move relatively slowly, the period of time required for a mobile to move out of the bordering macro cell may be relatively long. During this period of time (which may be relatively long), the mobiles are not be served by either the femto cells or the macro cell, which may cause unacceptable service interruption.

SUMMARY OF THE INVENTION

Exemplary embodiments relate to methods for configuring a wireless network.

In at least one illustrative embodiment, a radio access network establishes a first color code for a femto subnet and a second color code for a macro subnet. The femto subnet includes a plurality of femto cells and the macro subnet includes at least one macro cell. The macro subnet borders the femto subnet. The radio access network identifies which of the plurality of femto cells border the macro subnet, and assigns the established color codes to femto cells in the femto subnet.

Within the bordering femto cells in the femto subnet, the radio access network broadcasts, via base stations within the femto cells, the first established color code as a primary color code and the second established color code as a secondary color code. The radio access network broadcasts only the second established color code as a primary color code within the macro cell. In response to a registration message from a mobile station in the femto subnet, the radio access network triggers idle hand-off of the mobile station from the macro subnet to the femto subnet.

Alternatively, in response to a registration message from the mobile station, the radio access network may trigger idle hand-off of the mobile station from the femto subnet to the macro subnet

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 2 is a flowchart illustrating a method for assigning color codes to femto cells within a femto coverage environment according to an example embodiment.

DETAILED DESCRIPTION OF THE EMBODIMENTS

Figure 1:
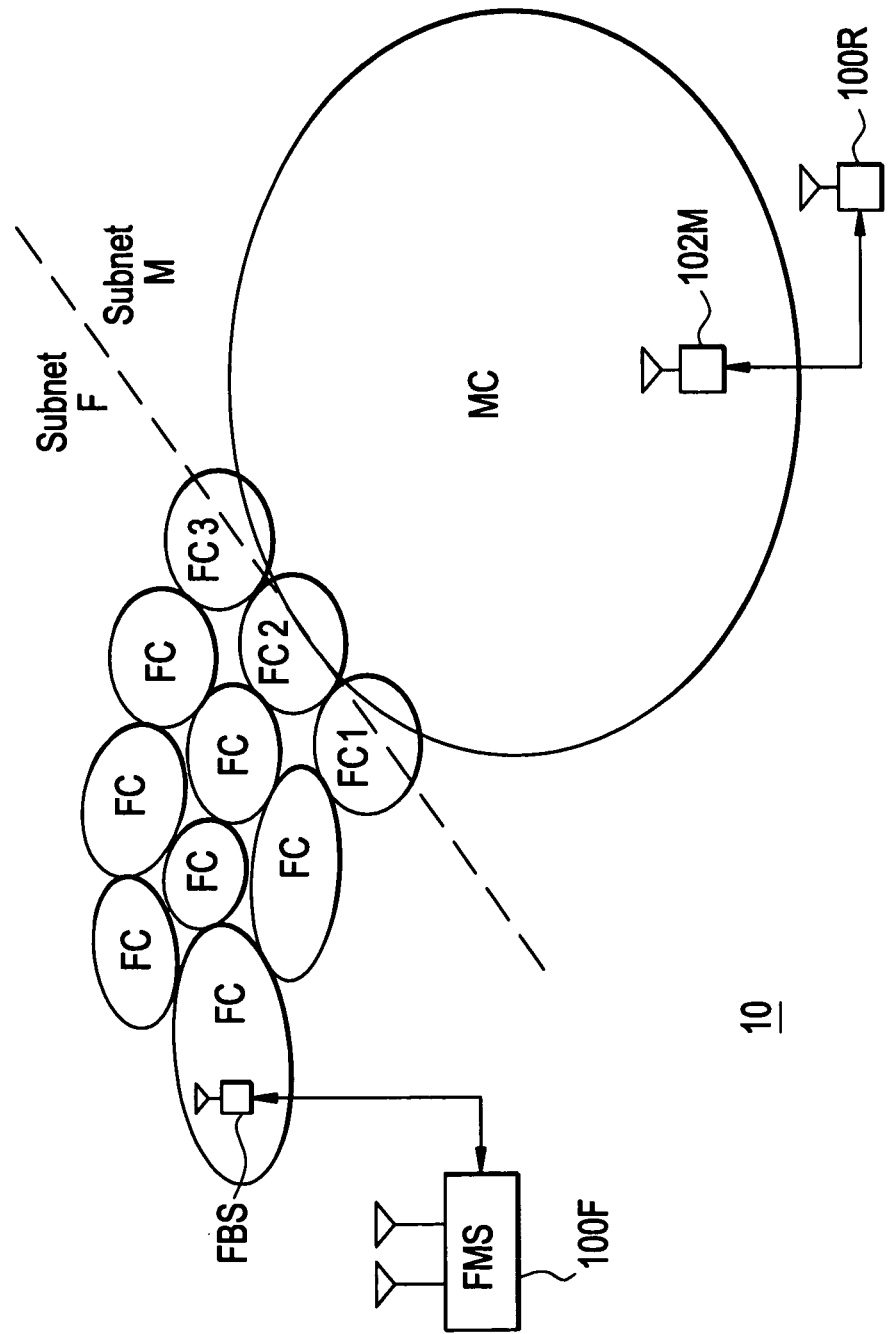
FIG. 1 illustrates a portion of a telecommunications system in which illustrative embodiments may be implemented.

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other illustrative embodiments that depart from these specific details. In some instances, detailed descriptions of well-known devices, circuits, and methods are omitted so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes such as a femto management system (FMS).

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As discussed herein, the term "user" may be considered synonymous to, and used interchangeably with, the term "mobile station."

FIG. 1 illustrates a portion of a telecommunications system in which illustrative embodiments may be implemented. The telecommunications system 10 includes a radio access network (RAN). The RAN includes a macro subnet M and a femto subnet F. A femto subnet refers to a group of adjacent femto cells in a relatively small geographical area. For example, a femto subnet may be a group of femto cells within a building or group of buildings, such as, an apartment, an office complex, etc.

The RAN shown in FIG. 1 is, by way of non-limiting example, a code division multiple access radio access network (CDMA RAN). In a CDMA RAN, radio access is based upon CDMA with individual radio channels allocated using CDMA spreading codes. Of course, other access methods may be employed.

The macro subnet M includes a RAN control node 100R and macro base station 102M. The RAN control node 100R may be, for example, a radio network controller (RNC) in a hierarchical network architecture or a session reference network controller (SRNC) in a flat network. The RAN control node 100R is linked with the macro base station 102M via one or more packet and/or circuit switched networks (e.g., one or more Internet Protocol (IP) networks or the like).

The macro base station 102M provides radio coverage in macro cell 100M, and is identified by a unique identity, which is broadcast within the macro cell 100M. As shown in FIG. 1, the RAN control node 100R maintains a link with macro base station 102M.

The femto subnet F includes a femto management system (FMS) 100F and a plurality of femto cells FC. Each of the femto cells FC has a femto base station FBS located therein. For the sake of clarity, however, only a single femto base station FBS is shown in FIG. 1.

Within the femto subnet F, the FMS 100F is analogous to and has the same functionality as the above-described RAN control node in the macro subnet M. Because such functionality is well-known, a detailed discussion will be omitted. The FMS 100F is linked with each femto base station FBS via one or more packet and/or circuit switched networks (e.g., one or more Internet Protocol (IP) networks or the like).

Each femto cell FC is identified by a unique identity, which is broadcast within the cell. As used herein, the phrase "femto base station" may be synonymous with "pico base station," or "micro base station." In FIG. 1, femto cells FC are interior or non-bordering femto cells, whereas the femto cells FC1, FC2 and FC3 are border femto cells directly bordering macro subnet M. Macro cell 100M is a macro cell within the bordering macro subnet M.

The nodes 100R, 100F, and FBS are termed a RAN control node, FMS, and femto base stations, respectively, in keeping with the CDMA RAN example. However, it should be understood that the term "radio network controller," and "base station," also encompasses nodes having similar functionality for other types of radio access networks.

Other types of telecommunications systems encompassing other types of radio access networks include, for example: Universal Mobile Telecommunications System (UMTS), Global System for Mobile communications (GSM), Advance Mobile Phone Service (AMPS) system, the Narrowband AMPS system (NAMPS), the Total Access Communications System (TACS), the Personal Digital Cellular (PDC) system, the United States Digital Cellular (USDC) system, the code division multiple access (CDMA) system described in EIA/TIA IS-95, Worldwide Interoperability for Microwave Access (WiMAX), ultra mobile broadband (UMB), and long term evolution (LTE), etc.

FIG. 1 shows only a single RAN control node 100R, FMS 100F, femto base station FBS, and macro base station 102M. It will be understood, however, that RANs may include any number of RAN control nodes, FMSs and base stations (femto and/or macro), which serve any number of mobile stations.

As is well-known, mobile stations communicate with femto base stations and/or macro base station 102M over an air interface. As described herein, a mobile station refers to, for example, a mobile telephone ("cellular" telephone), a portable computer, a pocket computer, a hand-held computer, a personal digital assistant (PDA), a car-mounted mobile device, or the like which communicates voice and/or data with the RAN.

Because coverage sizes of macro-cells and femto cells are significantly different, when the macro and femto coverage overlaps, applying the secondary color code at the overlapped macro cell causes unacceptable service interruption.

More specifically, as discussed above, in the current EVDO standard, the secondary color code mechanism provides spatial hysteresis preventing any mobile from conducting idle handoff when the mobile is in a border area covered by the secondary color code. In this case, if the secondary color code is applied at the bordering macro cell, relatively slow moving mobiles conduct handoff only after moving out of the bordering macro cell. Because these mobiles move relatively slowly, the period of time required for a mobile to move out of the bordering macro cell may be relatively long. During this period of time (which may be relatively long), the mobiles are not be served by either the femto cells or the macro cell, which may cause unacceptable service interruption.

Illustrative embodiments described herein suppress such service interruptions by reducing unnecessary transmission of secondary color codes at the overlapped macro cells. The secondary color codes are transmitted only at the border cells of the femto coverage zones.

FIG. 2 is a flowchart illustrating a method for assigning color codes to femto cells within a femto subnet according to an illustrative embodiment. The steps shown in the method of FIG. 2 may be performed by the RAN, for example, by a radio network control node such as FMS 100F of FIG. 1. For exemplary purposes, the illustrative embodiment shown in FIG. 2 will be described as being performed at FMS 100F.

Referring to FIG. 2, at step S202 the FMS 100F defines a group of femto cells constituting a femto subnet based on the geographic location of the femto cells in a three dimensional femto coverage space. The grouping of femto cells into a femto subnet may depend on the location and the number of femto cells in a given area. The location and number of femto cells within a given coverage area may be known at the FMS 100F.

At step S204, the FMS 100F may identify border femto cells within the femto subnet to identify the border of femto coverage provided by the femto subset. The border of the femto coverage may be adjacent to a macro subnet with generally overlapping radio-frequency (RF) coverage. A bordering femto cell is a femto cell located at an outer portion of the femto subnet. In other words, a bordering femto cell is a femto cell located adjacent to or partially overlapping a Macro-subnet.

Referring to FIG. 1, at step S204, the FMS 100F may identify femto cells FC1, FC2 and FC3 as bordering femto cells. The FMS 100F determines that femto cells FC1, FC2 and FC3 are bordering femto cells based on knowledge of the geographical femto subnet coverage edge (or border) and the macro subnet coverage edge (or border), each of which is known at the FMS 100F. In one example, this geographical information may be obtained in the field when the femto and/or macro cells are deployed.

Referring still to FIG. 2, at step S206 the FMS 100F assigns the same single primary color code to each non-bordering femto cell FC in subnet F. Also, at step S206, the RNC assigns a primary color code to the macro cell 100M in subnet M. The primary color code assigned to the macro cell 100M is different from the primary color code assigned to the interior femto cells FC. The primary color codes may be assigned in any well-known manner.

At step S208, the FMS 100F assigns a primary and secondary color code to each of the bordering femto cells FC1-FC3. The primary and secondary color codes may also be assigned in any well-known manner.

According to at least this exemplary embodiment, the primary color code assigned to the bordering femto cells FC1-FC3 is the same as the primary color code assigned to the interior femto cells FC. The secondary color code assigned to the bordering femto cells FC1-FC3 is the same as the primary color code assigned to the macro cell 100M in macro subnet M. Once assigned, each interior femto cell FC, bordering femto cells FC1-FC3 and macro cell 100M begins broadcasting their assigned color codes.

As discussed above, when in an idle mode, the mobile station periodically monitors the broadcast control channel for changes to sector-parameters such as color codes. One example in which sector-parameters change is when a mobile station moves between subnets. In this example, referring back to FIG. 1, when the idle mobile station moves from macro subnet M to femto subnet F, the mobile station receives a broadcast message including new color codes. The new primary color code (hereinafter referred to as updated or current color codes) is different from the previously received primary color code (hereinafter referred to as previous color codes), but the new secondary color code is the same as the previous primary color code. At this point, registration and idle handoff is not yet triggered because the new secondary color code is the same as the previous primary color code.

As the mobile station moves further and further into the femto subnet F, eventually the secondary color code is no longer transmitted. For example, when the mobile station moves from femto cell FC2 to interior femto cell FC, the mobile station no longer receives the secondary color code. At this point, the mobile station receives only an updated primary color code, which is different from the previous primary color code received from the macro cell MC. As a result, the mobile station triggers registration and idle handoff. That is, namely, the idle mobile station sends a registration message to the RAN, and a session transfer is conducted between the RAN control node 100R of the macro subnet M and the FMS 100F of the femto subnet F to handoff the mobile station from macro subnet M to femto subnet F.

In an alternative embodiment, the mobile station may trigger idle registration and handoff in response to receiving an updated primary and secondary color code, each of which are different from the previous primary color code. For example, if the mobile station crosses into a bordering femto cell, which borders a macro subnet different from the macro subnet in which the mobile station was previously located, the mobile station may trigger idle registration and handoff.

For the purposes of the discussion set forth herein, the mobile station may consider receiving no secondary color code at all as a different color code assuming the mobile station was previously receiving a secondary color code.

A similar idle handoff process may also occur when the idle mobile station moves from the femto subnet F to the macro subnet M. However, the idle handoff is triggered differently. As described above, when an idle mobile station moves from the macro subnet M into a femto subnet F, idle handoff is triggered when the mobile station receives only an updated primary color code that is different from the previous primary color code, and no longer receives a secondary color code. This may also be characterized as receiving a primary and secondary color code, each of which are different from the color code assigned to the macro subnet M.

By contrast, when a mobile station moves from the femto subnet F to the macro subnet M, a registration message and idle handoff are triggered in response to receiving an updated primary color code that is different from the previous primary color code, regardless of whether the mobile is currently receiving a secondary color code. That is, for example, as soon as the mobile station enters the macro subnet and begins receiving an updated, different primary color code, registration and idle handoff are triggered.

According to exemplary embodiments, changes in color code rules and/or usage of the color codes are transparent to mobile stations entering and/or leaving a particular cellular coverage area. In other words, changes need not be made at the mobile station to implement the method of the invention.

According to illustrative embodiments discussed herein, groups of the color codes are defined and dedicated to macro coverage subnets and femto coverage subnets. Mobile stations are also configured with a primary and a secondary color code during the initial session configuration. When a mobile station "wakes up" and reads the broadcast message, the mobile stations recognizes that the primary color code has changed from a macro cell color code to a femto cell color code, and the previous primary macro cell color code has now become the secondary color code. Based on the recognized change in color codes, the mobile station determines it is entering the border of a femto subnet from the macro coverage.

Similarly, if the mobile station sees a change in the primary color code from a femto color code to a macro color code, the mobile station determines it is moving out of the femto subnet into the macro subnet. In this case, a new rule of ignoring secondary color codes may be applied to suppress undesired service interruptions while still assigning a primary and secondary color code to macro cells in the macro subnet.

In one embodiment, the primary color code of a neighboring femto subnet may be assigned as the secondary color code of the macro subnet, but the mobile station ignores the secondary color code at the macro border sector when deciding whether to trigger handoff to the macro cell.

In the above-described illustrative embodiments a secondary color code is assigned to only one of two bordering subnets (e.g., at the femto subnet side due to the significant difference between the size of the macro cell and femto cells). The secondary code at the femto side requests a mobile station move further into the femto coverage before issuing a registration and handoff to the femto subnet thereby providing spatial hysteresis and suppressing ping-pong.

When a mobile station moves from femto subnet to macro subnet the handoff is triggered immediately because the secondary color code is ignored if it is dedicated to the femto subnet. Thus, the mobile station is not required to move the relatively long distance into the macro coverage area before handoff to the macro subnet is triggered.

In another illustrative embodiment, the color code dedicated to the femto subnets may be used as the secondary color code broadcast by a border sector of the macro subnet to alert the mobile station that it is nearing the outer edges of the macro subnet and femto coverage is nearby. That is, the secondary color code broadcast by the macro subnet may indicate to the mobile station that the mobile station is nearing a femto subnet.

In response to receiving the secondary color code from the macro subnet, the mobile station may prepare to trigger handoff from the macro subnet to the femto subnet. For example, in response to receiving the secondary color code, the mobile station may begin searching nearby pilots of femto cells using the secondary color code of the macro subnet in a manner commensurate with the femto cell as opposed to the macro cell. The mobile station may also make power adjustments for accessing the femto cell as opposed to macro cells.

The invention being thus described, it will be obvious that the same may be varied in many ways. Such variations are not to be regarded as a departure from the invention, and all such modifications are intended to be included within the scope of the invention.

We claim:

1. A method for configuring a wireless network, the method comprising:
   establishing, within a radio access network, a first color code for a femto subnet and a second color code for a macro subnet, the femto subnet including a plurality of femto cells, and the macro subnet including at least one bordering macro cell, the macro subnet bordering the femto subnet;
   identifying which of the plurality of femto cells border the macro subnet;
   first assigning the established first color code as a primary color code for the identified border femto cells in the femto subnet and the second color code as a secondary color code for the identified border femto cells in the femto subnet;
   second assigning only the established first color code as a primary color code for non-bordering femto cells in the femto subnet; and
   third assigning only the established second color code as a primary color code for the bordering macro cell in the macro subnet without assigning any secondary color code to the bordering macro cell in the macro subnet.

2. The method of claim 1, further comprising:
   first broadcasting, within the identified border femto cells, the established first color code as the primary color code for the identified border femto cells and the established second color code as the secondary color code for the identified border femto cells; and
   second broadcasting, within the bordering macro cell, only the established second color code as the primary color code for the bordering macro cell.

3. The method of claim 2, further comprising:
   receiving, from a mobile station in the femto subnet, a registration message in response to the first and second broadcasting steps; and
   triggering idle hand-off of the mobile station from the macro subnet to the femto subnet in response to the received registration message.

4. The method of claim 3, further comprising:
   generating, by the mobile station, the registration message in response to receiving only the established first color code, which is different from a previous primary color code received at the mobile station.

5. The method of claim 4, further comprising:
   receiving, from a mobile station in the macro subnet, a registration message in response to the first and second broadcasting steps; and
   triggering idle hand-off of the mobile station from the femto subnet to the macro subnet in response to the received registration message.

6. The method of claim 5, further comprising:
   generating, by the mobile station, the registration message in response to receiving the established second color code as the primary color code, which is different from the previous primary color code received by the mobile station.

7. The method of claim 4, further comprising:
   generating, by the mobile station, the registration message in response to receiving the established first color code and the established second color code; wherein
   the established first and second color codes are different from the previous primary color code received by the mobile station.

8. The method of claim 1, further comprising:
   storing the established first and second color codes in association with cell identifiers for each of the identified border femto cells.

9. The method of claim 1, further comprising:
   sending the assigned first and second color codes to border femto base stations corresponding to each of the identified border femto cells.

10. The method of claim 1, wherein the identifying step identifies the border femto cells based on geographical location of each of the plurality of femto cells in the femto subnet.

11. The method of claim 1, wherein the first assigning step assigns the established first color code as a the primary color code for each of the identified border femto cells and the established second color code as a secondary color code for each of the identified border femto cells, the method further comprising:
    preparing, by a mobile station, to trigger handoff from the macro subnet to the femto subnet in response to receiving secondary color code broadcast within a border sector of the bordering macro cell.

12. The method of claim 11, further comprising:
    receiving, from the mobile station in the femto subnet, a registration message; and triggering idle hand-off of the mobile station from the macro subnet to the femto subnet in response to the received registration message.

\* \* \* \* \*